(12) United States Patent
Yamada

(10) Patent No.: US 6,830,528 B2
(45) Date of Patent: Dec. 14, 2004

(54) MANUAL TRANSMISSION FOR FOUR-WHEEL DRIVE VEHICLE

(75) Inventor: Kenichi Yamada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/390,897

(22) Filed: Mar. 19, 2003

(65) Prior Publication Data

US 2003/0181279 A1 Sep. 25, 2003

(30) Foreign Application Priority Data

Mar. 20, 2002 (JP) ........................................ 2002-077514

(51) Int. Cl.⁷ .............................................. F16H 37/08
(52) U.S. Cl. ......................... 475/202; 475/206; 180/248
(58) Field of Search ........................... 180/248; 475/202, 475/206

(56) References Cited

U.S. PATENT DOCUMENTS 5,906,557 A * 5/1999 Kobayashi .................. 475/199

FOREIGN PATENT DOCUMENTS

JP 10-166877 6/1998

* cited by examiner

*Primary Examiner*—Dirk Wright
(74) *Attorney, Agent, or Firm*—McGinn & Gibb, PLLC

(57) ABSTRACT

A manual transmission for a four-wheel drive vehicle transmits a power to a front drive shaft for driving front wheels and to a rear drive shaft for driving rear wheels through a propeller shaft. A plurality of shift gear trains are formed by drive gears mounted on an input shaft, driven gears meshing with the drive gears and mounted on an output shaft arranged below the input shaft and clutches. The output shaft is hollowed inside to incorporate the front drive shaft therein. An intermediate shaft is rotatably, coaxially disposed with the input shaft and is driven by the output shaft through a connection gear train. The intermediate shaft is coaxially connected with a transfer unit from which power is distributed to the front drive shaft through another connection gear train and at the same time to the rear drive shaft. Further, the transmission incorporates another clutch for directly transmitting power from the input shaft to the intermediate shaft so as to produce a shift gear ratio of 1.0.

5 Claims, 6 Drawing Sheets

MANUAL TRANSMISSION FOR FOUR-WHEEL DRIVE VEHICLE

BACKGROUND OF THE INVENTION

1. Field of the Invention

The present invention relates to a manual transmission for a four-wheel drive vehicle capable of transmitting an engine power to both front and rear wheels of a vehicle.

2. Discussion of Related Arts

Generally, a manual transmission comprises an input Shaft inputting engine power through a clutch, a plurality of drive gears mounted on the input shaft, an output shaft and a plurality of driven gears constantly meshing with the respective drive gears, forming a plurality of shift gear trains between the input and output shafts. Further, the manual transmission has clutches such as synchromesh mechanisms for changing over the engagement of the respective gear trains between a power transmission condition and a power shut-off condition and when a driver operates a shift lever, the clutches are actuated to change over either of the gear trains to a power transmission condition.

The manual transmission for a four-wheel drive vehicle has a front drive shaft provided coaxially in a hollow output shaft and connected with a front final reduction gear apparatus or a front differential and a rear drive shaft connected with a rear final reduction gear apparatus or a rear differential through a propeller shaft. Further, the transmission has a power distribution apparatus or a transfer unit for distributing power between the front drive shaft and the rear drive shaft. The power distribution apparatus can change a power distribution ratio of front wheels to rear wheels of driving force, when drive wheels slip on a road surface with low friction coefficient or when there occurs a difference of rotation by more than a specified value between the front wheels and the rear wheels.

In a conventional manual transmission for a four wheel drive vehicle in which the output shaft is disposed below the input shaft, the power distribution apparatus is disposed coaxially with the output shaft at the rear of the output shaft. In thus layouted transmission, a large thrust load is applied from an orthogonal gear of the front final reduction gear to bearings for supporting the output shaft through the front drive shaft. As a result, not only the bearings are needed to be up-sized, a large power loss generates in the bearings due to the large thrust load applied thereto. Further, the up-sizing of the bearings itself generates a larger rotational loss. Hence, this type of the manual transmission has a difficulty in enhancing an efficiency of power transmission.

On the other hand, lubrication oil is accommodated in the transmission case in order to lubricate meshing surfaces of the gears and sliding surfaces of the shafts. When a vehicle travels, the lubrication oil is splashed by rotating gears and is supplied to required parts of the transmission. In case where the power distribution apparatus is coaxially disposed with the output shaft as described above, the power transmission apparatus is positioned at the lower part of the transmission. Hence, since the lubrication oil is agitated, while a large part of the power distribution apparatus is dipped in under the static oil level, a larger agitation resistance is exerted on the output shaft.

To solve this problem, Japanese Patent Application Laid-open No. Toku-Kai-Hei 10-166877 discloses a manual transmission for a four wheel drive vehicle in which an output shaft is coaxially disposed with a first input shaft connected to an engine and a second input shaft connected with the first input shaft through gears is arranged below the output shaft and a plurality of gear trains are provided between the output shaft and the second input shaft. The advantage of this transmission is that the power distribution apparatus can be disposed coaxially with the output shaft above the second input shaft and since the power distribution apparatus is located in a position higher than the oil level, the agitation resistance in the power distribution apparatus can be reduced.

However, in this type of the transmission, since a front drive shaft is incorporated in a hollow second input shaft, there always exists a rotational difference between the second input shaft and the output shaft, except when the first input shaft is directly connected with the output shaft in a fourth gear position. That is, since the front drive shaft slides around the second input shaft with a working load of gear applied to both shafts, a loss of power transmission is generated on the sliding surface.

SUMMARY OF THE INVENTION

It is an object of the present invention to provide a manual transmission in which there is no relative rotation between the hollow shaft and the front drive shaft inside of the hollow shaft, when a vehicle travels straightforwardly. It is another object of the present invention to enhance an efficiency of power transmission by reducing loads exerted from an orthogonal gear of a front final reduction gear on the bearings. It is further object of the present invention to reduce agitation resistance of lubrication oil in the power distribution apparatus.

In order to achieve the objects, a manual transmission of a four-wheel drive vehicle having a front drive shaft for driving front wheels and a rear drive shaft for driving rear wheels, comprises an input shaft for inputting an engine power, a plurality of shift drive gears mounted on the input shaft, an output shaft hollowed inside and provided below the input shaft and incorporating the front drive shaft therein, a plurality of shift driven gears mounted on the output shaft and meshing with the shift driven gears, a plurality of shift gear trains formed by the shift drive gears and the shift driven gears meshing with the shift drive gears between the input and output shafts, a plurality of clutches for changing over the shift gear trains between a power transmitting condition and a power shut-off condition, an intermediate shaft disposed rotatably, coaxially with the input shaft, a first connection drive gear integrally mounted on the output shaft, a first connection driven gear integrally mounted on the intermediate shaft and meshing with the first connection drive gear, a second connection drive gear integrally mounted on the intermediate shaft, a second connection driven gear integrally mounted on the front drive shaft and meshing with the second connection drive gear, and a power distributing apparatus coaxially connected with the intermediate shaft and coaxially connected with the rear drive shaft for distributing a power transmitted from the intermediate shaft between the front drive shaft and the rear drive shaft.

Further, the gears constituting the transmission are helical gears so as to generate an axial force to cancel the load from the orthogonal gear of the front final reduction gear unit.

DESCRIPTION OF THE PREFERRED EMBODIMENT

Figure 1:
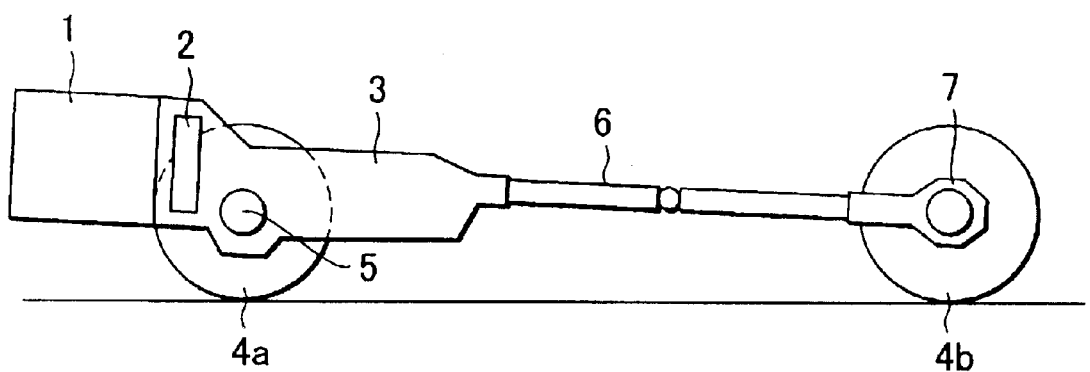
FIG. 1 is a schematic view showing a power transmission system for a four-wheel drive vehicle according to an embodiment of the present invention.

Referring now to FIG. 1, reference numeral 1 denotes an engine and reference numeral 2 denotes a clutch and reference numeral 3 denotes a manual transmission. The transmission 3 inputs power from the engine 1 through the clutch 2 and transmits the power to a front wheel 4a through a front wheel final reduction gear unit 5 and a rear wheel 4b through a propeller shaft 6 and a rear wheel final reduction gear unit 7 to a rear wheel 4b, respectively. The respective final reduction gear units 5, 7 have a differential gear unit, respectively. The manual transmission 3 is a five-forward-speed transmission mounted on a vehicle in a longitudinal direction of the vehicle.

Figure 2:
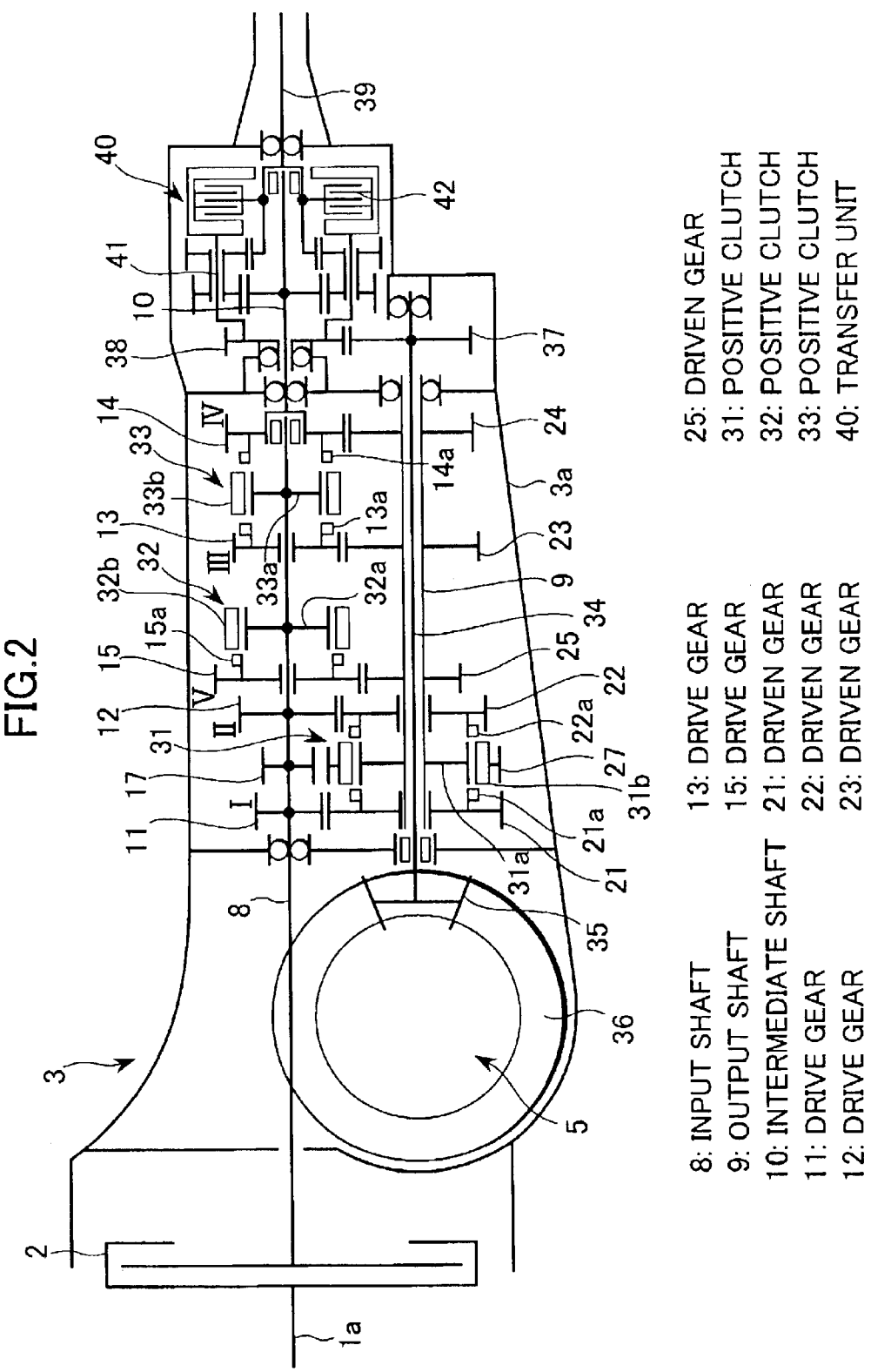
FIG. 2 is a skeleton diagram showing a manual transmission illustrated in FIG. 1.

Referring to FIG. 2, an input shaft 8 to which an engine power is inputted through a crankshaft 1a of the engine 1 and the clutch 2, and a hollow output shaft 9 arranged in parallel with and below the input shaft 8, are rotatably incorporated in a transmission case 3a, respectively. A drive gear 11 of the first gear ratio and a drive gear 12 of the second gear ratio are integrally mounted on the input shaft 8 and a drive gear 13 of the third gear ratio and a drive gear 15 of the fifth gear ratio are rotatably mounted thereon. On the other hand, a driven gear 21 of the first gear ratio and a driven gear 22 of the second gear ratio are rotatably mounted on the output shaft 9 and a driven gear 23 of the third gear ratio and a driven gear 25 of the fifth gear ratio are integrally mounted thereon. The drive gears 11, 12 of the input shaft 8 constantly mesh with the driven gears 21, 22 of the output shaft 9, respectively. Further, the drive gears 13, 15 of the input shaft 8 constantly mesh with the driven gears 23, 25 of the output shaft 9, respectively. Thus, a first speed gear train is formed by the drive gear 11 and the driven gear 21 and a second speed gear train is formed by the drive gear 12 and the driven gear 22. Similarly, a third speed gear train is formed by the drive gear 13 and the driven gear 23 and a fifth speed gear train is formed by the drive gear 15 and the driven gear 25.

Further, an intermediate shaft 10 is rotatably, coaxially coupled with the rear part of the input shaft 8. A driven gear 14 for the fourth gear ratio is integrally mounted on the intermediate shaft 10 and constantly meshes with a drive gear 24 integrally mounted on the output shaft 9. The drive gear 24 is for transmitting a shift output other than the fourth gear ratio.

A first clutch 31 is provided on the output shaft 9 to change over the gear train into either of the first speed gear train, the second speed gear train and the neutral position in which power is transmitted nowhere. Further, a second clutch 32 is provided on the input shaft 8 to change over the gear train into either the fifth speed gear train or the neutral position and a third clutch 33 is provided on the input shaft 8 to change over the gear train into either of the third speed gear train, the fourth speed gear train and the neutral position.

The respective clutches are constituted by a synchromesh mechanism. The first clutch 31 has a synchronizer hub 31a secured to the output shaft 9 and a synchronizer sleeve 31b axially slidable so as to engage with splines 21a, 22a provided in the gears 21, 22, respectively. The second and third clutches 32, 33 have synchronizer hubs 32a, 33a secured to the input clutch 8 and synchronizer sleeves 32b, 33b so as to engage with splines 15a, 13a, 14a provided in the respective gears 15, 13, 14, respectively. A desired gear position is obtained by actuating the respective clutches when a driver operates a shift lever.

A reverse drive gear 17 is integrally mounted on the input shaft 8 and a reverse driven gear 27 is mounted on a synchronizer sleeve 31b. Further, an idler gear (not shown) is axially slidably mounted on an idler shaft (not shown) and when the idler gear engages with the drive gear 17 and the driven gear 27, the rotation of the input shaft 8 is reversely transmitted to the output shaft 9. The axial movement of the idler gear is performed by an operation mechanism (not shown).

When gear positions other than the fourth gear ratio, that is, the first gear ratio, the second gear ratio, the third gear ratio and the fifth gear ratio, are established, the engine power inputted to the input shaft 8 is transmitted to the output shaft 9 and further transmitted to the intermediate shaft 10 through the connection gear train 24, 14. When the fourth gear ratio is selected, the input shaft 8 is directly connected with the intermediate shaft 10 by the clutch 33 and the engine power is transmitted directly from the input shaft 8 to the intermediate shaft 10.

A front drive shaft 34 is rotatably, coaxially incorporated in the hollow output shaft 9 and has an orthogonal gear 35 at the front end thereof. The orthogonal gear 35 meshes with a reduction gear 36 to transmit power to a front wheel 4a.

The intermediate shaft 10 is connected with a power distribution apparatus (hereinafter, referred to as transfer unit) 40 constituted by a center differential unit comprising a planetary gear train 41 and a multiple disc clutch 42. The transfer unit 40 has a drive gear 38 meshing with a driven gear 37 integrally formed with a rear end of the front drive shaft 34. That is, a front drive gear train is formed by these gears 37, 38. Further, the transfer unit 40 has a rear drive section 39 connected to the propeller shaft 6. When a rotational difference occurs between front and rear wheels, the rotational difference is absorbed by a differential rotation of the planetary gear train.

Thus, since the transfer unit 40 is mounted on the intermediate shaft 10 arranged above the output shaft 9, the oil level of lubrication oil accommodated in a transmission case 3a is in a lower position than the transfer unit 40, the miscellaneous rotating components in the transfer unit 40 never agitates the lubrication oil and as a result the agitation resistance applied to the transfer unit 40 can be reduced, whereby the fuel economy is enhanced.

The gear ratio of the connection gear train formed by the driven gear 14 and the drive gear 24 and that of the front drive gear train formed by the driven gear 38 and the driven gear 37 are equal to 1.0 respectively. Accordingly, the rotation speed of the intermediate shaft 10 is equal to that of the output shaft 9 over all gear positions. When the vehicle travels straightforwardly, since there is no differential rotation in the transfer unit 40, the output shaft 9 rotates integrally with the front drive shaft 34 incorporated in the output shaft 9 and there is no sliding motion between both shafts. Whereby, the friction loss between the output shaft 9 and the front drive shaft 34 can be prevented.

Figure 3:
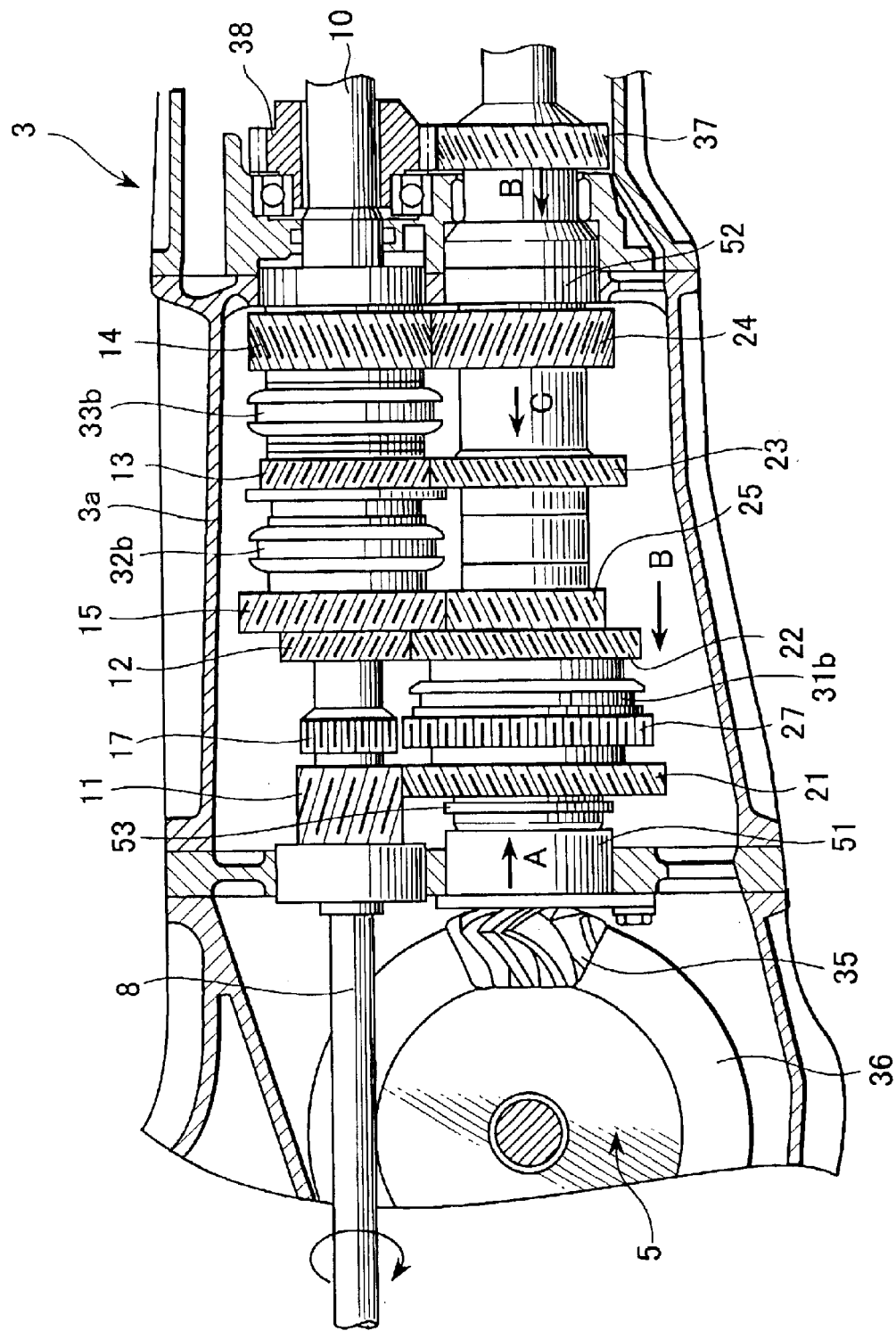
FIG. 3 is a partially side view showing gear trains of a manual transmission illustrated in FIG. 1.
Figure 4:
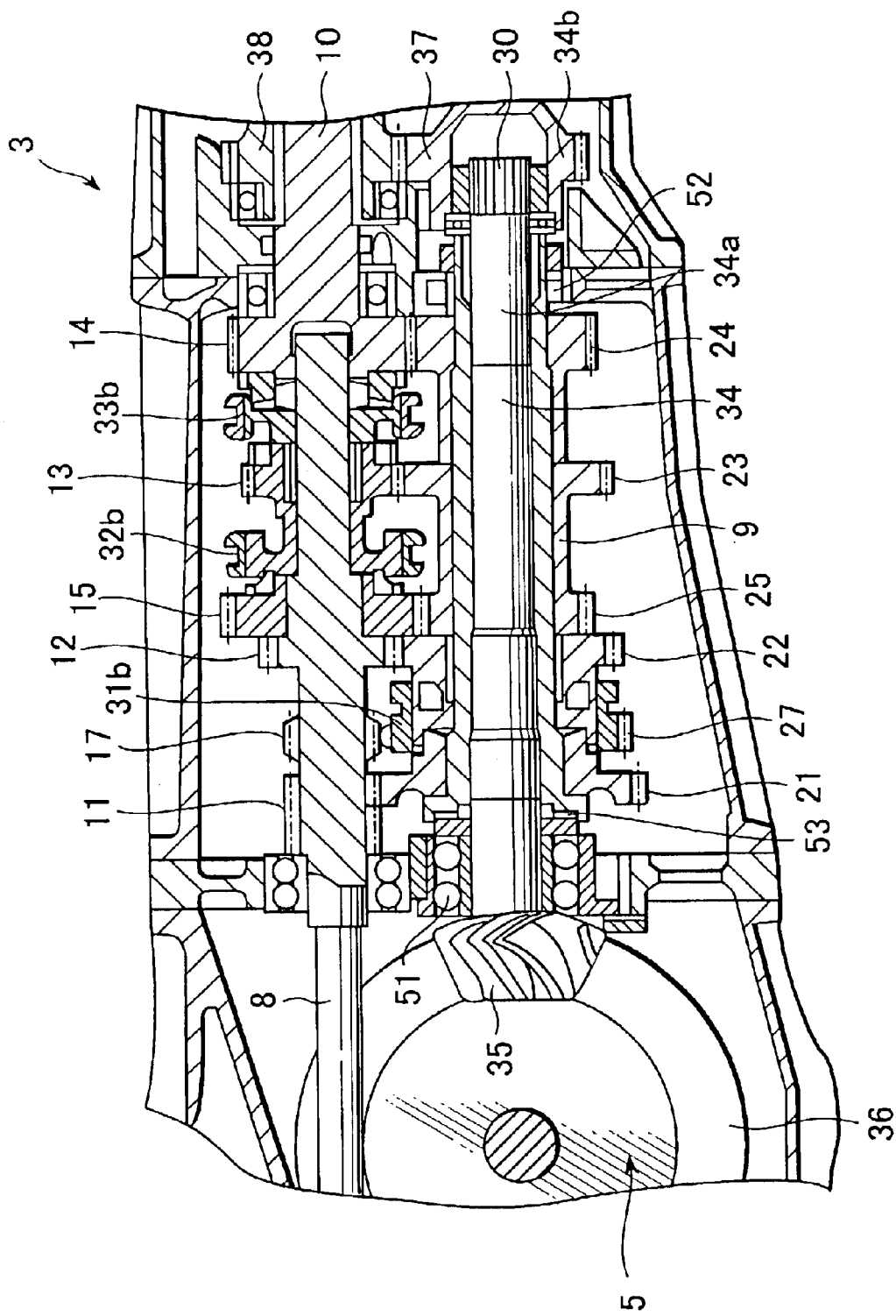
FIG. 4 is a sectional view of FIG. 3.

Referring to FIG. 4, the front drive shaft 34 is rotatably supported at the front end thereof by the transmission case 3a through an angular contact type ball bearing 51 and the output shaft 9 incorporating the front drive shaft therein is rotatably supported at the rear end thereof by the transmission case 3a through a roller bearing 52. A needle thrust bearing 53 is provided at the front end of the output shaft 9 in order to bear a thrust load from the front drive shaft 34. As shown in FIG. 3, an axial force is applied in a direction marked A from the front final reduction-gear unit 5 to the front drive shaft 34 through the orthogonal gear 35 and further applied to the angular contact type ball bearing 51. On the other hand, an axial force is applied from the power transmission gear trains to the thrust bearing 53 of the output shaft 9. When the vehicle travels straightforwardly, since there is no relative rotation between the output shaft 9 and the front drive shaft 34, the durability of the bearing can be enhanced.

The shift gear trains from the first to fifth gear ratios, the connection gear train and the front drive gear train, are constituted by helical gears. When a certain pair of gears are transmitting power, a component force as indicated by an arrow B in FIG. 3 is exerted on the teeth flank of working gears in a reverse direction to the arrow A. Accordingly, a reaction force is exerted on the output shaft 9 in a direction canceling the axial force A originating from the front final reduction gear unit 5. As a result, the axial load applied to the bearing 51 is reduced and a ball bearing can be used instead of a tapered roller bearing. As a result, the power transmission efficiency is enhanced and the fuel economy goes up. As shown in FIG. 4, the front drive shaft 34 is constituted by two portions, a portion 34a on which the orthogonal gear 35 is provided and a portion 34b on which the driven gear 37 is provided and these two portions are coupled with each other by a serration 30. The driven gear 37 is supported at the front end thereof by the rear end of the output shaft 9 through a thrust bearing.

Figure 5:
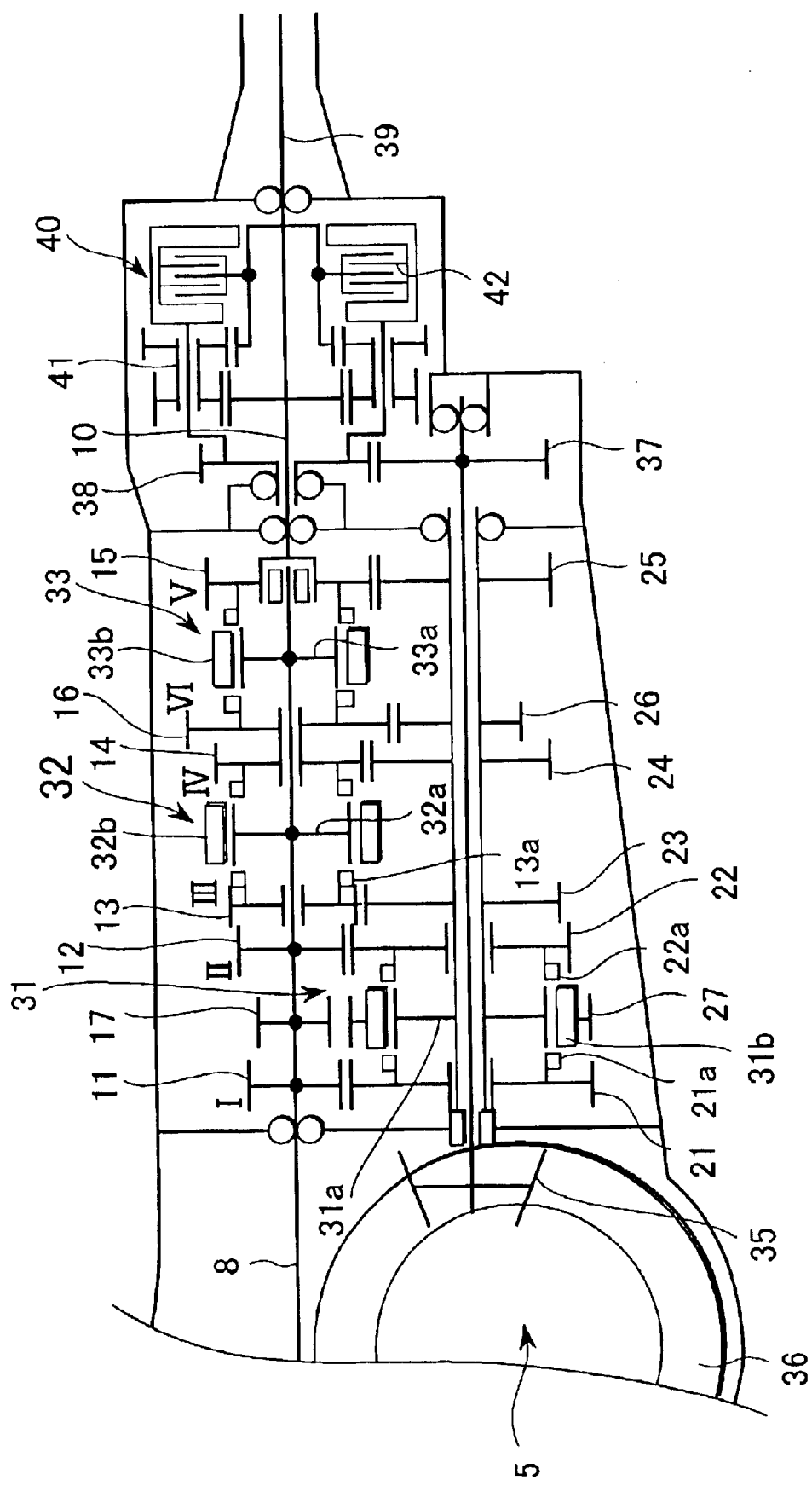
FIG. 5 is a skeleton diagram showing a manual transmission for a four-wheel drive vehicle according to another embodiment of the present invention.

FIG. 5 is a skeleton diagram showing a manual transmission for a four-wheel drive vehicle according to another embodiment of the present invention. This transmission has six forward speeds. In the transmission, drive gears 11, 12, 13, 14 and 16 are mounted on the input shaft 8 for first, second, third, fourth gear ratios respectively and driven gears 21, 22, 23, 24 and 26 constantly meshing with the drive respective gears are mounted on the output shaft 9. A connection gear train is formed by a driven gear 15 integrally mounted on the intermediate shaft 10 and a drive gear 25 integrally mounted on the output shaft 9. The gear ratio of the connection gear train is 1.0. The second clutch 32 changes over the shift gear train between the third gear ratio and the fourth gear ratio and the third clutch 33 changes over the gear train between the fifth gear ratio and the sixth gear ratio. The transmission according this embodiment has a similar structure to that shown in FIG. 1 except for the number of shift gear trains. The components of the transmission which are identical in both drawings FIG. 2 and FIG. 5 are denoted by identical reference numbers.

Figure 6:
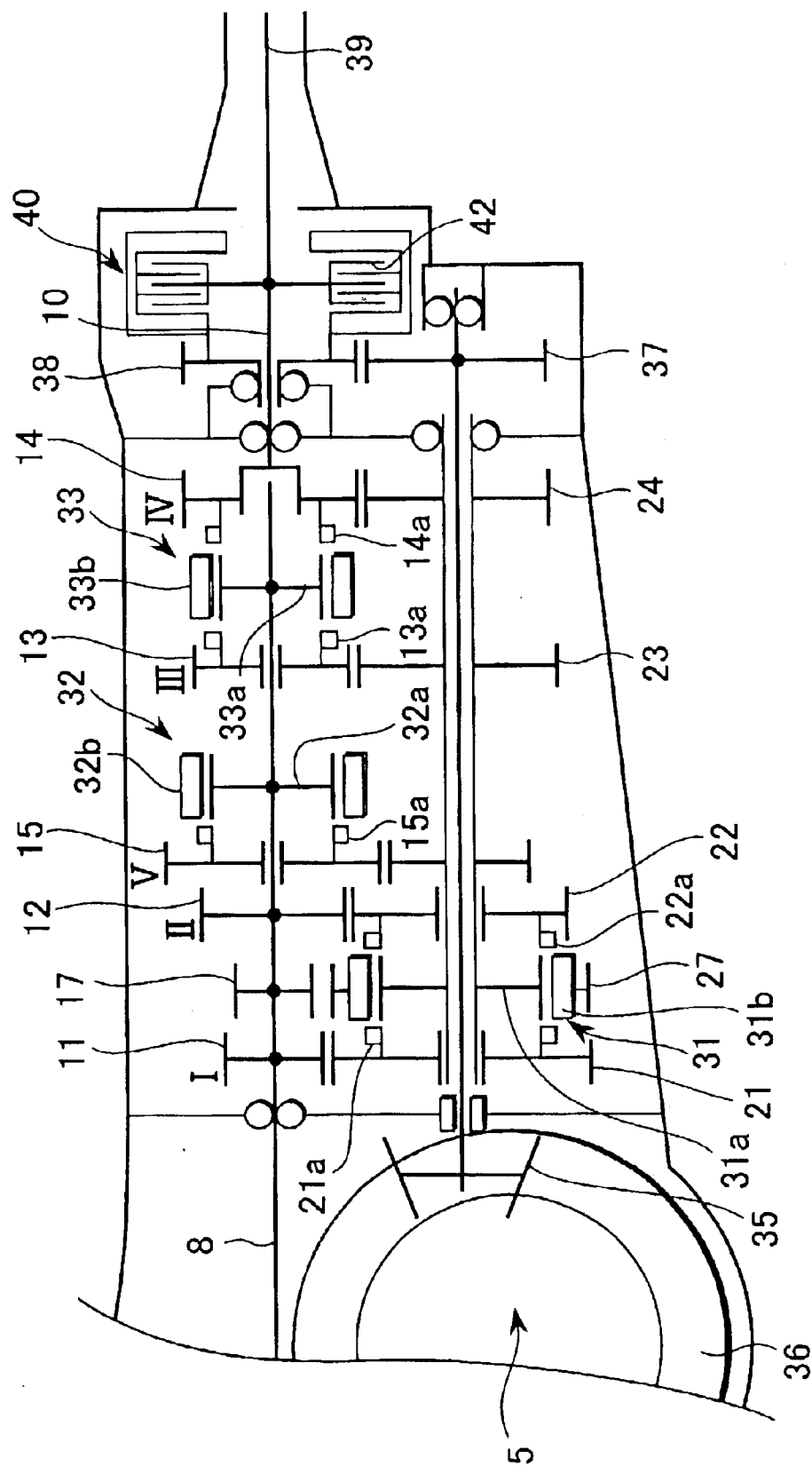
FIG. 6 is a skeleton diagram showing a manual transmission for a four-wheel drive vehicle according to a further embodiment of the present invention.

FIG. 6 is a skeleton diagram showing a manual transmission for a four-wheel drive vehicle according to a further embodiment of the present invention. The components identical in both drawings FIG. 1 and FIG. 6 are denoted by identical reference numbers. This transmission has five forward speed ratios in the same way as that shown in FIG. 2. The transfer unit 40 is formed only by a multiple disc clutch or a viscous coupling 42 but has no center differential unit. The intermediate 10 is connected at the rear end thereof with a rear drive section 39. Further, the rear drive section 39 is connected at the rear end thereof with the propeller shaft 6.

Also in the transmissions shown in FIG. 5 and FIG. 6, in the same manner as the transmission shown in FIG. 2, since the transfer unit 40 is coaxially coupled with the input shaft 8 and is disposed above the output shaft 9, the agitating resistance of lubrication oil is prevented from being exerted on the output shaft 9. Further, since a large axial force is prevented from being applied to the bearing for supporting the front drive shaft 34, the power transmission efficiency can be enhanced. Further, when the vehicle travels straightforwardly, since a relative rotation does not generate between the output shaft 9 and the front drive shaft 34 incorporated in the output shaft 9, the power transmission efficiency can be raised.

The entire contents of Japanese Patent Application No. Tokugan 2002-77514 filed Mar. 20, 2002, which forms priority claimed in the present application, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A manual transmission of a four-wheel drive vehicle including a front drive shaft for driving front wheels and a rear drive shaft for driving rear wheels, comprising:

an input shaft for inputting an engine power;

a plurality of shift drive gears mounted on said input shaft;

an output shaft hollowed inside and provided below said input shaft and incorporating said front drive shaft therein;

a plurality of shift driven gears mounted on said output shaft and meshing with said shift drive gears;

a plurality of shift gear trains formed by said shift drive gears and said shift driven gears meshing with said shift drive gears between said input and output shafts;

a plurality of clutches for changing over said shift gear trains between a power transmitting condition and a power shut-off condition;

an intermediate shaft disposed rotatably, coaxially with said input shaft;

a first connection drive gear integrally mounted on said output shaft;

a first connection driven gear integrally mounted on said intermediate shaft and meshing with said first connection drive gear;

a second connection drive gear disposed rotatably coaxially with said intermediate shaft; said intermediate shaft;

a second connection driven gear integrally mounted on said front drive shaft and meshing with said second connection drive gear; and a power distributing apparatus coaxially connected with said intermediate shaft and coaxially connected with said rear drive shaft for distributing a power transmitted from said intermediate shaft between said front drive shaft and said rear drive shaft.

2. The transmission according to claim 1, further comprising:

another clutch for selectively connecting said input shaft with said intermediate shaft to obtain a shift gear ratio different from shift gear ratios of said shift gear trains.

3. The transmission according to claim 2, wherein said shift gear ratio is equal to 1.0.

4. The transmission according to claim 1, further comprising:

a thrust bearing provided between said front drive shaft and said output shaft.

5. The transmission according to claim 4, wherein said shift drive gears, said shift driven gears, said first connection drive gear, said first connection driven gear, said second connection drive gear and said second connection driven gear, comprise helical gears that generate an axial force in a direction canceling a load applied from a front final reduction gear unit through said thrust bearing.

* * * * *